July 12, 1927.

F. M. HOLDEN 1,635,213

YIELDING MOTOR SUSPENSION

Filed April 20, 1921    2 Sheets-Sheet 1

Witness:-

Inventor
Fenn M. Holden
By his Attorneys

July 12, 1927.

F. M. HOLDEN 1,635,213

YIELDING MOTOR SUSPENSION

Filed April 20, 1921

Witness

Inventor
Fenn M. Holden
By his Attorneys

Patented July 12, 1927.

1,635,213

UNITED STATES PATENT OFFICE.

FENN M. HOLDEN, OF DETROIT, MICHIGAN, ASSIGNOR TO GENERAL MOTORS CORPORATION, OF DETROIT, MICHIGAN, A CORPORATION OF DELAWARE.

YIELDING MOTOR SUSPENSION.

Application filed April 20, 1921. Serial No. 463,021. REISSUED

The invention relates to means for supporting an engine upon a frame or automobile chassis and is more particularly concerned with an engine suspension embodying means whereby vibration incident to the operation of the engine is prevented from being transmitted to the chassis frame, especially to portions thereof adjacent to the steering column.

It has been found that vibration in a horizontal plane due to unbalanced forces developed in the operation of some types of engines, if permitted to be transmitted to the chassis frame of an automobile in which such engine is employed as a source of power, causes vibration of the body and particularly of the steering gear column and parts supported thereby, which vibration is likely to be disagreeable, and may at certain speeds cause a feeling of numbness in the hands of the driver.

One of the objects of the invention therefore is to eliminate disagreeable vibration in the steering column of an automobile due to engine vibration by the provision of means adapted to substantially prevent transmission of such engine vibration to the frame or chassis in the vicinity of the steering column.

A further object is to provide an engine support embodying yieldable connections whereby the transmission to the supporting frame of engine vibration in a horizontal plane will be substantially eliminated.

A further object is to improve the construction of an automobile by the provision of means for reducing the vibration of the body or the body supporting frame due to engine vibration in a horizontal plane.

With the above and other objects in view, as will appear more fully from the following description, the invention comprises the features of novelty herein disclosed, together with such variations and modifications as fall within the scope of the appended claims.

In the accompanying drawings, showing means in which the invention may be embodied, Fig. 1 is a plan view of a portion of an automobile chassis having an engine mounted thereon;

Figure 5:
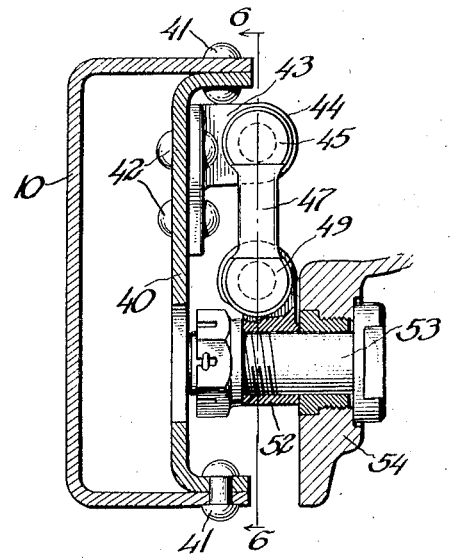
Figure 6:
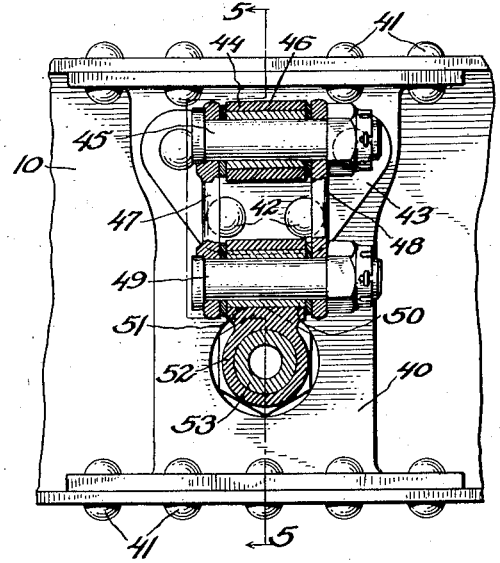
Figure 7:
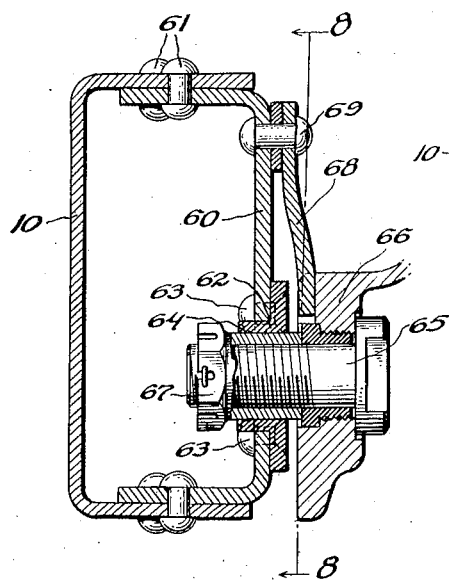
Figure 8:
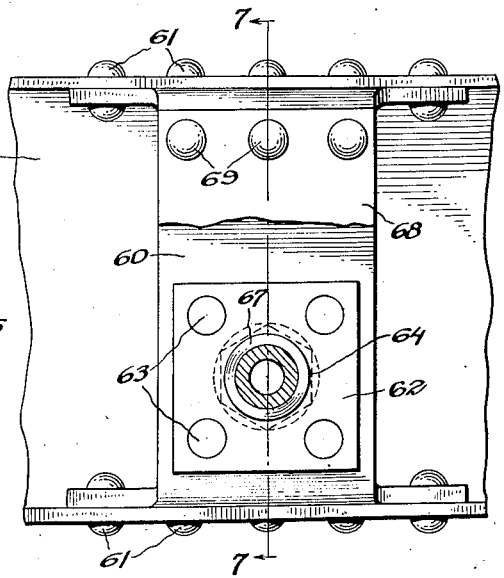

Fig. 5 is a section on line 5—5 of Fig. 6 and Fig. 6 a section on line 6—6 of Fig. 5, showing a modified form of engine supporting device; and Figs. 7 and 8 are, respectively, a section and elevation of a second modified form, Fig. 7 being taken on line 7—7 of Fig. 8.

Referring to the drawings, 10, 11, indicate the longitudinal side members of an automobile chassis, which members may be of any usual or desired form but are shown as of a channel form commonly employed in automobile frames. The side members may be connected by transverse frame elements, one of which is indicated at 12 or 12'. An internal combustion engine 13, illustrated as of the V-type, is supported upon the frame members at a plurality of points, a three-point suspension being shown in Fig. 1 and a four-point suspension in Fig. 2. In the suspension illustrated in Fig. 1, the engine frame is connected to the side members 10, 11, respectively, by supporting devices 14, 15, and is centrally supported upon a transverse frame member, as at 16. In the suspension illustrated in Fig. 2, the engine frame is connected to the side members directly at two points adjacent the front end and two points adjacent the rear end, as 17, 18, 19 and 20. Steering mechanism as indicated at 21 is mounted upon one of the side frame members, preferably upon the left side, the mechanism being operable by the steering wheel 22 and connected to dirigible ground wheels by the drag link 23.

Figure 1:
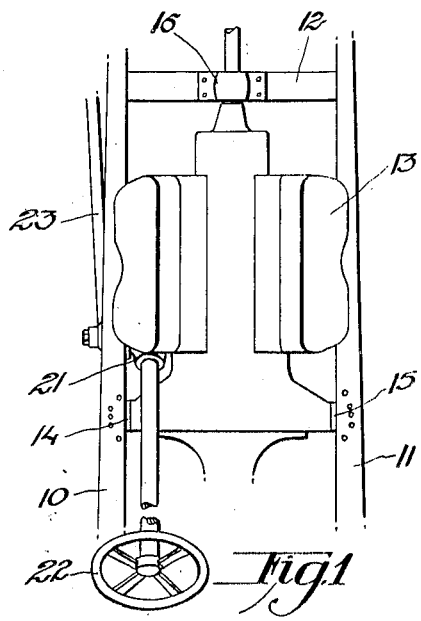
Figure 2:
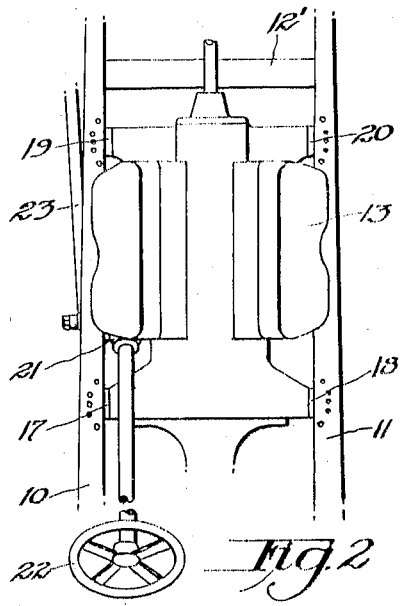
Fig. 2 is a similar view showing a slightly different form of engine suspension.
Figure 3:
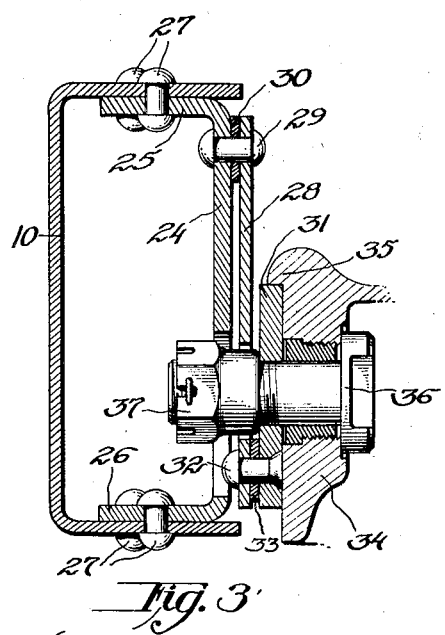
Figs. 3 and 4 are, respectively, a section and an elevation of one improved form of engine supporting device, Fig. 3 being taken on line 3—3 of Fig. 4.
Figure 4:
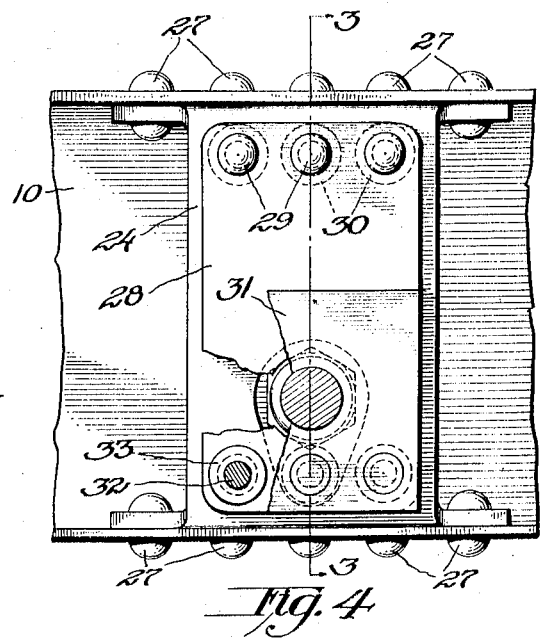

A suspending device whereby the engine frame may be connected to the side members 10, 11, at one or more of the points of support indicated in Figs. 1 and 2 is shown in Figs. 3 and 4. In this form of the invention a bracket member or bar 24, having laterally directed flanges 25, 26, at top and bottom respectively, is rigidly secured to the flanges of the channel shaped side member as by rivets 27. A resilient plate or link 28 is secured at its upper end to the bracket as by rivets 29 and is spaced slightly from the bracket by washers 30 so as to be capable of some swinging movement without contacting with the face of the bracket. To the lower end of the resilient plate or link is secured a supporting block 31 by rivets 32 passing through spacing washers 33. A part 34 intergral with or rigidly attached to the engine frame is supported upon the block 31, the said engine part being formed with a shoulder 35 adapted to overlie and rest directly upon the block. The latter is rigidly secured to the engine as by a bolt 36 and nut 37, apertures being provided in the lower portion of the bracket 24 and the link 28 through which the nut and the end of the bolt may extend.

It will be seen that the construction described permits the engine to swing freely within certain limits determined by the spacing of the parts under the restraint due to the normal tendency of the engine to return to a central position and to the distortion or deflection of the resilient plate or link. The transmission to the chassis frame, however, of minor vibrations in a horizontal plane, such as those due to the unbalanced forces operative in the V-type engine, is almost entirely eliminated. This is of particular advantage in relieving the driver from the discomfort due to the transmission of such vibrations to the steering post and wheel, the steering mechanism being usually mounted upon the side frame member adjacent to one of the engine supports and therefore being especially liable to be influenced by such vibrations. For this reason it is desirable to employ one of the improved suspending devices at least at the points indicated by 14 and 17, although it will be understood that similar devices may be utilized at the other points of suspension, especially when it is desired to prevent transmission of horizontal vibrations to the vehicle body.

In the form of the invention illustrated in Figs. 5 and 6, the plate 40 is secured to the flanges of the chassis side member 10 as by rivets 41. To the plate 40 is fastened, as by rivets 42, a bracket 43 provided with an apertured lug 44 in which is journaled a pin 45, a bushing 46 being interposed between the lug and pin. Two links 47, 48, depend from the end portions of the pin 45, one on each side of the lug 44. The lower ends of these links support a second pin 49 carrying a bushing 50 upon which is journaled a hanger 51. The hanger is provided with a collar 52 adapted to fit around a bolt or gudgeon 53 whereby the hanger may be fixedly secured to the engine part 54.

With this construction it will be seen that the engine is suspended by freely movable links so that transmission of transverse vibrations to the chassis frame may be substantially eliminated as with the form first described, there being no point where the engine frame abuts against or rests directly upon the chassis frame.

In the form illustrated in Figs. 7 and 8, the bracket or plate 60, secured to the flanges of the channel bar 10 by rivets 61, is formed with an aperture 62 in which is secured, as by rivets 63, a member having a collar 64. A gudgeon 65 is rigidly mounted upon the engine part 66 as by nut 67, the latter being formed with a sleeve fitting the interior of collar 64. A spring 68 secured to plate 60 by rivets 69 may be employed, if desired, to restrain the lateral movement of the engine relative to the chassis.

In this form of the invention it will be seen that I provide for free relative sliding movement of the engine supporting parts to an extent sufficient to substantially eliminate the lateral vibration with the type of engine employed.

It will be understood that while the suspension devices described have been found useful in preventing transmission to the steering gear or to the vehicle body of vibration due to the peculiarities of the V-type engine with cylinders set at an angle of 90°, it will be applicable for a similar purpose irrespective of the cause or origin of the lateral vibrations. It will be understood also that if it be desired merely to eliminate vibration from the steering column and attached parts, it may be sufficient to employ the improved suspension only on the side adjacent the steering mechanism, the engine being connected to the frame on the other side by a rigid or any other suitable form of connection.

I claim:

1. Engine suspending means comprising a frame having two side members, an engine, means for rigidly connecting the engine to one of said members, and means for suspending the engine from the other member comprising a vertically arranged flexible link fixed at its upper end to the side member and at its lower end to the engine.

2. In an automobile, a chassis frame having side members, a steering column supported upon one of said side members, an engine rigidly connected to the other side member and yieldably connected to the side member carrying said steering column at a point adjacent to the point of support of said column, said yieldable connection including a resilient bar interposed between the engine and frame member to resist relative movements therebetween.

3. In an automobile, the combination with an engine and a chassis frame having a side frame member, of a resilient flat bar fixed rigidly at its upper end to said frame member, a supporting block fixed to the lower end of the bar, said block arranged to support the engine, said parts arranged to permit relative swinging movement of the engine under resilient restraint due to the bending of the bar.

In testimony whereof I affix my signature.

FENN M. HOLDEN.